United States Patent Office 3,082,100
Patented Mar. 19, 1963

3,082,100
MANUFACTURE OF CRYSTALLINE POROUS STONES
Erich Wolf, Kassel-Wilhelmshohe, Germany, assignor to Schlosser & Co. G.m.b.H., Michelbach, Nassau, Germany
No Drawing. Filed July 14, 1959, Ser. No. 826,912
Claims priority, application Germany May 16, 1959
15 Claims. (Cl. 106—40)

Juvenile lavas rich in gas, particularly the basic (basaltic) lavas, are characterized by the fact that when in the cooled and solid state they are largely crystalline in spite of their pronounced porosity. Lavas poor in gas tend very much to vitrify in compact form when they solidify.

These characteristics of juvenile lavas are due to the fact that at the moment of the discharge of the lava upon the surface of the earth during volcanic activity, the gases (predominantly water or water vapor) which are dissolved in the lava begin to escape, whereby in addition to the formation of bubbles there takes place a discontinuance of the strong reduction in the solidification, due to the presence thereof in the magmatic melt. At the same time, crystallization of the melt is favored as long as the gases remain in solution. Simultaneously with the release of the gases giving rise to the porous formation, increase in viscosity occurs along with enhanced crystallization.

This process of solidification of the gas-containing magma is not reversible due to the loss of the highly volatile components of the magma. That is, once a lava has cooled into rock it cannot be returned to its previous condition by a remelting thereof.

Porous lava rocks of this kind have a very high resistance to pressure in consequence of their porous structure and crystallinity. Consequently, they constitute ideal natural material for the manufacture of light and hollow construction rocks or aggregates which are bonded by cements.

Consequently it is customary to designate the melt which is obtained from a cooled lava by remelting thereof, as by heating, as a "dry" melt, whereas the original juvenile melt is referred to as a "wet" melt.

Dry melts are subject to materially different conditions of solidification and crystallization than wet melts.

The molten slags which are obtained from blast furnace plants, blast furnaces and power plants which use coal as the source of energy, are always dry melts, these being poor in gas and consequently having a tendency to solidify as compact heavy masses, most of which are vitreous.

It was impossible heretofore to convert such dry melts into wet melts which would on solidification provide formation of pores and crystals so highly desired.

The principal object of this invention is to provide a method of converting blast furnace slags and the slags of other blast furnace plants, as well as the molten ashes of power plants using coal, into wet melts so that such melts, as so changed or modified, will solidify simultaneously in porous and crystalline form. That is, it is the object to obtain by artificial means a product which is similar to the natural porous or bubble-containing basaltic lava rock.

According to the invention, the additions of certain natural rocks or minerals in granular or powder form, and in predetermined quantities, are introduced into the slag while it is in the fluid or liquid state.

The following are suitable for addition to the molten slags and/or ashes:

(1) Basic and ultrabasic rocks: serpentine, picrite, including picritic green earth (celadonite), saxonite, harzburgite, diabase, melaphyre, and also the groups of chlorite slate, talcum slate, serizite slate (ottrelith slate and karpholite slate), phyllite and, furthermore, sedimentary glaukonite rocks.

(2) Brown iron ore, chamositic or thuringitic iron ores, and bauxite.

(3) Porphyry tuffs, in particular silicified porphyry tuffs, quartz keratophyres, rhyolith tuffs, perlite tuffs; trachyte tuffs, in particular trass (calcareous tuffs); phonolith tuffs, especially nepheline-leucite-phonolith tuffs, tuffs of the porphyrites, andesites and melaphyres; basal tuffs, especially peperin, pelagonite tuffs, diabase tuffs.

These additions contain water (for instance the molecular complexes of OH) in silicatic bound form or bound with $Fe_2O_3$ and $Al_2O_3$ (as for example, minerals of the chlorite and serpentine group, serizite, iron and aluminum hydroxides).

These rock or minerals when added to the molten slag or ash at room temperature, slowly release the chemically bound water and the OH-containing minerals therein in consequence of the fact that the melt is at high temperature (1100–1400° C.). Such release is more or less gradual during the prolonged temperature and time interval involved. During such time interval, such rocks or minerals slowly reach the temperature of the melt. During such period there occurs [in addition to the assimilation (contamination) of these additions by the melts] cooling of the melt and simultaneously a general lowering of the melting point due to the incorporation of the water which constitutes an exothermic dissolution process. Due to the absence of external pressure, the water which is incorporated in the melt exerts a vigorous mineralizing action, that is crystallization promoting action, and is released in a short time whereby bubbles and pores are formed in the melt (creaming effect); and the reduction of the melting point is again eliminated.

The progressing crystallization and reversal of the lowering of the melting points cause a rapid increase in viscosity which prevents the new foamy melt from collapsing, as well as prevents release of the gas bubble from the melt.

Mechanical agitation of the slag melt while under these conditions accelerates and promotes this process, especially the release of the water in gaseous form and the progress of the crystallization.

The quantity and the type of the rocks and/or minerals added to the molten slag or ash can be so varied that the crystalline phases which are formed during the solidification of the slag are air- and water-stable. That is, the formation of cement clinker materials having hydraulic characteristics is prevented.

A slag rock thus produced has a high resistance to pressure due to its crystallinity and its porous structure. It is particularly suitable as an additive for the manufacture of cement-bound, light weight concrete stones.

The mentioned additional materials can be incorporated individually in the liquid molten slag in order to obtain the desired effects. However, mixtures of the named addition materials can also be included. Preferably, the addition or additions are used in an amount totalling up to 10% by weight. It will be obvious that the effect thereof can be enhanced if more than 10% by weight is employed.

The amount of the crushed rock added to the above described liquid slag (referred to herein generally as "slag") should be at least 5% by weight with respect to the mass of the liquid slag; and should not exceed 30%. Preferably, the amount of the added rock should constitute from 5 to 15% of the total mass.

The rock added to the molten slag can vary in size from 3 to 6 millimeters mesh to granules having an average diameter of 4 millimeters. Preferably, the range should be 5 mesh to a diameter of 4 millimeters.

The following are examples in accordance with this invention:

Example 1

A vessel is charged with 100 kilos of molten blast furnace slag having a temperature of 1350° C. 10 kilos of basalt tuff, 4 millimeters granulate, are added thereto. The mass is stirred to effectuate thorough distribution of the added rock, as long as the slag is stirrable. The still stirrable slag is removed from the vessel by turning over the vessel. The mass is crushed to a size of 0–15 millimeters. The crushings are employed in the manufacture of concrete.

Example 2

A vessel is charged with 100 kilos of molten blast furnace slag having a temperature of 1400° C. 10 kilos of picrite and brown iron ore, in proportion one to one, 5 millimeters granulate are added thereto. The mass is stirred to effectuate thorough distribution of the added rock, as long as the slag is stirrable. The still stirrable slag is removed from the vessel by turning over the vessel. The mass is crushed to a size of 0–15 millimeters. The crushings are employed in the manufacture of concrete.

Example 3

A vessel is charged with 100 kilos of molten coal ash from power plants having a temperature of 1300° C. 10 kilos diabase and brown iron ore, in proportion one to one, 4 millimeters granulate are added thereto. The mass is stirred and worked up as described in Examples 1 and 2.

It will be understood that the foregoing description of the invention and the examples set forth are merely illustrative of the principles thereof. Accordingly, the appended claims are to be construed as defining the invention within the full spirit and scope thereof.

I claim:

1. The method of forming porous crystalline material which comprises thoroughly distributing crushed tuff within a fluid mass of a liquid slag having a temperature of about 1300–1400° C., the amount of the crushed tuff being about 5 to 30% by weight based on the slag, and allowing the mixture slowly to cool.

2. The method of forming porous crystalline material which comprises distributing crushed tuff within a fluid mass of liquid slag having a temperature of about 1300–1400° C., the amount of the crushed tuff being about 5 to 30% by weight based on the slag, agitating the same to effect thorough distribution of the crushed tuff, and allowing the mixture slowly to cool.

3. Method in accordance with claim 1 wherein the slag is blast furnace slag.

4. Method in accordance with claim 1 wherein the slag is an ash melt of coal.

5. Method in accordance with claim 1 wherein the tuff is picrite.

6. Method in accordance with claim 5 where, in addition to the picrite, there is distributed in the liquid slag a member of the group consisting of picritic green earth, saxonite, harzburgite, diabase, melaphyre, chlorite slate, talcum slate, serizite slate, ottrelith slate, karpholite slate, phyllite, glaukonite, brown iron ore, chamositic and thuringitic iron ores, and bauxite.

7. Method in accordance with claim 1 wherein the tuff is at least one member of the group consisting of porphyry tuffs, silicified porphyry tuffs, quartz keratophyres, rhyolith tuffs, perlite tuffs, trass, trachyte tuffs, phonolith tuffs, nepheline-leucite-phonolith tuffs, tuffs of porphyrites, andesites and melaphyres, peperin, basalt tuffs, pelagonite tuffs and diabase tuffs.

8. Method in accordance with claim 1 wherein the tuff amounts to 10% by weight based on the slag.

9. Method in accordance with claim 1 wherein the tuff is serpentine.

10. Porous, crystalline material which is a matrix of solidified slag through which is distributed at least one in an amount of 5–30% by weight based on the slag.

11. Porous, crystalline material which is a matrix of solidified slag through which is distributed at least one member of the group consisting of porphyry tuffs, silicified porphyry tuffs, quartz keratophyres, rhyolith tuffs, perlite tuffs, trass, trachyte tuffs, phonolith tuffs, nepheline-leucite-phonolith tuffs, tuffs of porphyrites, andesites and melaphyres, peperin, basal tuffs, pelagonite tuffs and diabase tuffs, in crushed form and in an amount of 5–30% by weight based on the slag.

12. Porous, crystalline material in accordance with claim 11 wherein the crushed distributed material is present in an amount of 5–10% of weight based on the slag.

13. Porous, crystalline material which is a matrix of solidified slag through which is distributed crushed water-containing rock, said rock being a member of the group consisting of picritic green earth, saxonite, harzburgite, diabase, melaphyre, chlorite slate, talcum slate, serizite slate, ottrelith slate, karpholite slate, phyllite, glaukonite, brown iron ore, chamositic and thuringitic iron ores, and bauxite, the said crushings constituting from 5–30% by weight based on the slag.

14. Porous, crystalline material in accordance with claim 10 wherein the slag is an ash melt of coal.

15. Porous, crystalline material in accordance with claim 10 wherein the slag is a blast furnace slag.

References Cited in the file of this patent

UNITED STATES PATENTS

| 1,108,007 | Ribbe | Aug. 18, 1914 |
| 2,017,889 | Bowyer | Oct. 22, 1935 |
| 2,661,575 | Kennedy | Dec. 8, 1953 |